(12) United States Patent
Molinari et al.

(10) Patent No.: US 9,339,975 B2
(45) Date of Patent: May 17, 2016

(54) 3D PRINTER WITH NATIVE SPHERICAL CONTROL

(71) Applicant: NIKE, Inc., Beaverton, OR (US)

(72) Inventors: Arthur Molinari, Portland, OR (US); Aaron Bender, Portland, OR (US)

(73) Assignee: Nike, Inc., Beaverton, OR (US)

( * ) Notice: Subject to any disclaimer, the term of this patent is extended or adjusted under 35 U.S.C. 154(b) by 195 days.

(21) Appl. No.: 14/144,909

(22) Filed: Dec. 31, 2013

(65) Prior Publication Data

US 2015/0183167 A1   Jul. 2, 2015

(51) Int. Cl.
*B29C 67/00* (2006.01)
*B29K 101/12* (2006.01)
*B33Y 30/00* (2015.01)
*B33Y 50/02* (2015.01)

(52) U.S. Cl.
CPC ......... *B29C 67/0088* (2013.01); *B29C 67/0055* (2013.01); *B29C 67/0085* (2013.01); *B29K 2101/12* (2013.01); *B33Y 30/00* (2014.12); *B33Y 50/02* (2014.12)

(58) Field of Classification Search
CPC ............ B29C 67/0085; B29C 67/0055; B29C 67/0088; B33Y 30/00; B33Y 50/02; B29K 2101/12
USPC ........................ 425/60, 385; 219/76.12, 76.14
See application file for complete search history.

(56) References Cited

U.S. PATENT DOCUMENTS

| | | | | |
|---|---|---|---|---|
| 3,417,429 A | * | 12/1968 | Wright | B28B 1/02 264/34 |
| 3,923,573 A | * | 12/1975 | Hay, II | B29C 67/20 156/186 |
| 3,966,533 A | * | 6/1976 | Goldsworthy | E04H 7/02 156/379.8 |
| 4,041,476 A | * | 8/1977 | Swainson | B01J 19/121 345/419 |

(Continued)

OTHER PUBLICATIONS

Inernational Search Report in PCT Application No. PCT/US2014/067018, mailed on Feb. 26, 2015.

*Primary Examiner* — Yogendra Gupta
*Assistant Examiner* — Emmanuel S Luk
(74) *Attorney, Agent, or Firm* — Quinn Law Group, PLLC (57) ABSTRACT

A three dimensional printer includes a work surface, an arcuate track disposed within in a track plane that is orthogonal to the work surface, a carriage slidably disposed on the track and translatable relative thereto, and a print head supported by the carriage. The track has a constant radius of curvature extending from a point on the work surface. The print head is translatable in a radial direction relative to the track, and includes a nozzle defining a print orifice, a mixing cavity disposed within the nozzle and in fluid communication with the orifice, and both a first and second filament feeder, each configured to controllably advance a respective filament into the mixing cavity at a respective feed rate. The print head further includes a heating element in thermal communication with the mixing cavity and configured to melt each of the first filament and the second filament.

14 Claims, 5 Drawing Sheets

(56) References Cited

U.S. PATENT DOCUMENTS

| | | | | |
|---|---|---|---|---|
| 4,098,635 A | * | 7/1978 | Hay, II | F16L 59/10 156/445 |
| 4,128,369 A | | 12/1978 | Kemerer et al. | |
| 4,247,508 A | * | 1/1981 | Housholder | B29C 67/0077 264/122 |
| 4,372,733 A | * | 2/1983 | Tinning | E04G 11/34 264/32 |
| 4,734,021 A | * | 3/1988 | Maddock | E04B 1/164 264/32 |
| 5,121,329 A | | 6/1992 | Crump | |
| 5,134,569 A | * | 7/1992 | Masters | B29C 35/08 156/272.8 |
| 5,936,861 A | | 8/1999 | Jang et al. | |
| 6,175,422 B1 | * | 1/2001 | Penn | B29C 67/0059 345/419 |
| 6,210,142 B1 | * | 4/2001 | Huesers | E04B 1/3211 264/32 |
| 6,441,338 B1 | * | 8/2002 | Rabinovich | B21D 37/205 219/121.64 |
| 7,153,454 B2 | * | 12/2006 | Khoshnevis | B29C 67/0055 264/173.12 |
| 7,604,470 B2 | * | 10/2009 | LaBossiere | B29C 67/0055 425/131.1 |
| 8,439,665 B2 | * | 5/2013 | Batchelder | B29C 67/0055 425/144 |
| 8,512,024 B2 | * | 8/2013 | Pax | B29C 67/0055 226/181 |
| 2004/0084814 A1 | | 5/2004 | Boyd et al. | |
| 2005/0039843 A1 | * | 2/2005 | Johnson | B29C 53/70 156/175 |
| 2005/0166413 A1 | * | 8/2005 | Crampton | B25J 13/088 33/503 |
| 2007/0062321 A1 | * | 3/2007 | Chablat | B23Q 1/5462 74/479.01 |
| 2007/0075460 A1 | | 4/2007 | Wahlstrom et al. | |
| 2012/0018924 A1 | * | 1/2012 | Swanson | B29C 47/0014 264/401 |
| 2013/0189435 A1 | * | 7/2013 | Mackie | B29C 67/0055 427/256 |
| 2014/0036035 A1 | * | 2/2014 | Buser | H04N 1/00286 348/46 |
| 2014/0232035 A1 | * | 8/2014 | Bheda | B29C 67/0055 264/148 |
| 2015/0035198 A1 | * | 2/2015 | Saba | B29C 67/0088 264/211.12 |
| 2015/0140147 A1 | * | 5/2015 | Konstantinos | B33Y 30/00 425/131.1 |
| 2015/0183161 A1 | * | 7/2015 | Molinari | B29C 67/0085 425/375 |
| 2015/0183167 A1 | * | 7/2015 | Molinari | B29C 67/0088 425/167 |

* cited by examiner

3D PRINTER WITH NATIVE SPHERICAL CONTROL

TECHNICAL FIELD

The present invention relates generally to a 3D printer that is controllable to print a hemispherical solid through a plurality of successively formed shells.

BACKGROUND

Three dimensional (3D) printing is a process of making a three-dimensional solid object from a digital model. The printing is an additive process, where successive layers are built upon previous layers to "grow" the object. 3D printing is different from other molding or manufacturing techniques that can rely on filling a mold or removing material such as by cutting or drilling.

SUMMARY

A three dimensional printer (3D printer) includes a work surface, an arcuate track disposed within in a track plane that is orthogonal to the work surface, a carriage slidably disposed on the track and translatable relative thereto, and a print head supported by the carriage. The track has a constant radius of curvature extending from a point on the work surface.

The print head is translatable in a radial direction relative to the track, and includes a nozzle defining a print orifice, a mixing cavity disposed within the nozzle and in fluid communication with the orifice, and both a first and second filament feeder, each configured to controllably advance a respective filament into the mixing cavity at a respective feed rate. The print head further includes a heating element in thermal communication with the mixing cavity and configured to melt each of the first filament and the second filament.

In one configuration, the work surface is defined by a turntable that is configured to controllably rotate about an axis normal to the work surface. In another configuration, a motor may be coupled with the arcuate track and configured to controllably rotate the track plane about an axis extending normal to the work surface.

The 3D printer further includes a controller configured to control the motion of the print head relative to the work surface in three dimensions. The controller may further be configured to control the respective feed rate of each of the first and second filament feeders. In one configuration, the controller is configured to control the motion of the print head relative to the work surface by specifying a radial distance, a polar angle, and an azimuth angle for the print head relative to the work surface. Once those parameters are specified, the controller may control the motion of the carriage, print head, and relative rotation between the track and work surface to achieve the specified parameters.

The above features and advantages and other features and advantages of the present invention are readily apparent from the following detailed description of the best modes for carrying out the invention when taken in connection with the accompanying drawings.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

DETAILED DESCRIPTION

Figure 1:
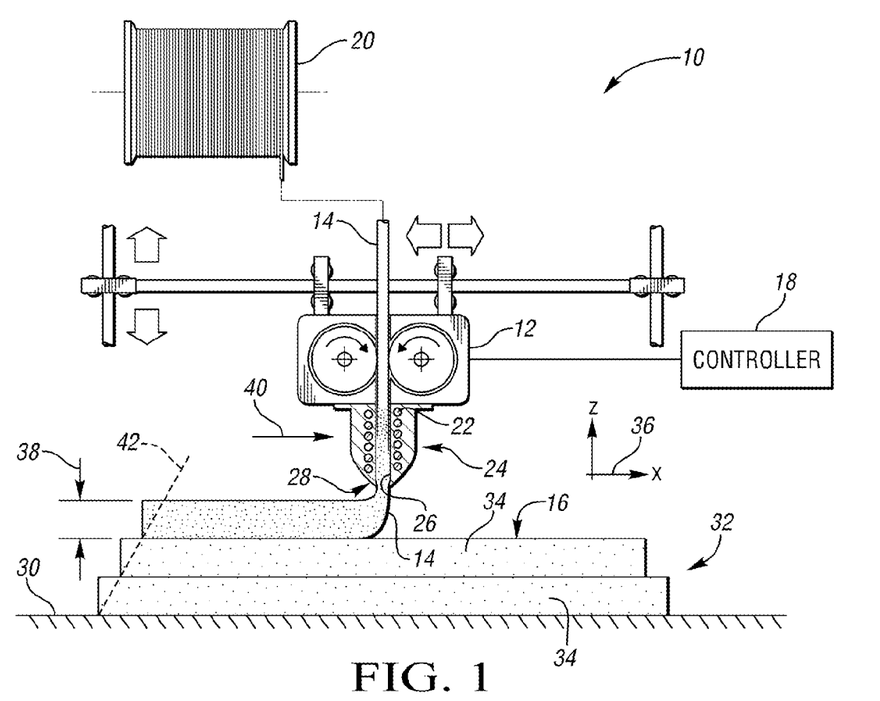
FIG. 1 is a schematic cross-sectional side view of a 3D printer printing an object using Cartesian-based control.

Referring to the drawings, wherein like reference numerals are used to identify like or identical components in the various views, FIG. 1 schematically illustrates a three-dimensional printer 10 (3D printer 10) that may be capable of forming a polymeric object. In general, 3D printing is an additive part-forming technique that incrementally builds an object by applying a plurality of successive thin material layers. At its core, a 3D printer includes a print head 12 configured to controllably deposit/bind a stock material 14 onto a substrate 16, and motion controller 18 that is configured to controllably translate a print head 12 within a predefined workspace. The techniques described herein are applicable to a type of 3D printing known as Fused Filament Fabrication. The print head 12 may be configured to receive the solid stock material 14 from a source such as a spool 20 or hopper, melt the stock material 14 (e.g., using a resistive heating element 22), and expel the molten stock material 14 onto the substrate 16 via a nozzle 24. In general, the nozzle 24 may define an orifice 26 at its distal tip 28 through which the molten material 14 may exit the print head 12.

Once out of the nozzle 24, the molten stock material 14 may begin cooling, and may re-solidify onto the substrate 16. The substrate 16 may either be a work surface 30 that serves as a base for the object 32, or may be a previously formed/ solidified material layer 34. In the case where the molten stock material 14 is applied over a previously formed material layer 34, the temperature of the molten stock material 14 may cause localized surface melting to occur in the previous material layer 34. This localized melting may aid in bonding the newly applied material with the previous layers 34.

In one configuration, the print head 12 may be controlled within a Cartesian coordinate system 36, where three actuators can each cause a resultant motion of the print head in a respective orthogonal plane (where convention defines the X-Y plane as a plane parallel to the work surface 30, and the Z-direction as a dimension orthogonal to the work surface 30). As material 14 is applied to the substrate 16, the thickness 38 and width of the applied material bead may be a function of the motion 40 of the print head 12 relative to the substrate 16, as well as the rate at which the solid stock material 14 is fed into the print head 12. For a constant print head motion 40 and constant feed rate for the solid stock material 14, each applied material bead may have a substantially constant height/thickness 38 and width. In one configuration, the thickness 38 may be less than about 1.2 mm (i.e., from about 0.1 mm to about 1.2 mm).

Figure 2:
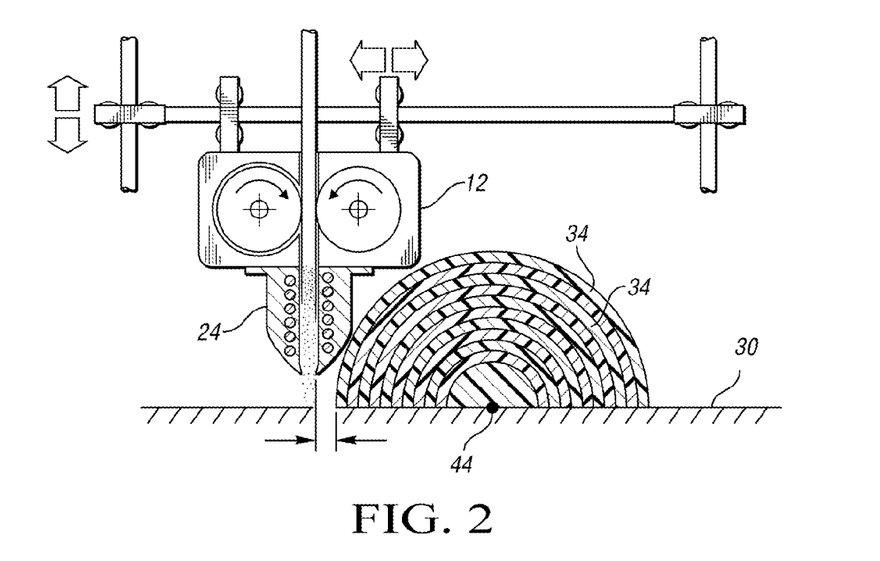
FIG. 2 is a schematic cross-sectional side view of a 3D printer printing a hemispherical object using Cartesian-based control.

FIGS. 1 and 2 generally illustrate two shortcomings of typical 3D printers when attempting to create a curved object via Cartesian control. As shown in FIG. 1, if an inclined edge geometry is required (i.e., along the datum 42 provided in phantom), the incline may only be approximated, since the layer thickness and inability to control the edge geometry may create a stair-stepped edge resolution. If a smooth edge is then required, a subsequent process must be used to remove material back to the datum 42. This may present challenges and/or increase fabrication complexity and time if a smooth sloped edge is required at an interface between two different material layers.

In addition to only being able to create rough edge contours, certain geometries and/or print head motion paths can be precluded by the physical dimensions of the print head 12. For example, FIG. 2 generally illustrates a print head 12 moving in an arcuate manner in the X-Z plane, with successive layers 34 being disposed radially outward from a center point 44. As shown, the print head 12 reaches a point where the width of the nozzle and curvature of the previous layer 34 obstruct the print head 12 from starting a subsequent layer. In this manner, special adaptations may be required to create, for example, a hemispherical object that is formed through a plurality of discrete shells (i.e., where one or more shells may have a different material composition than other shells).

Figure 3:
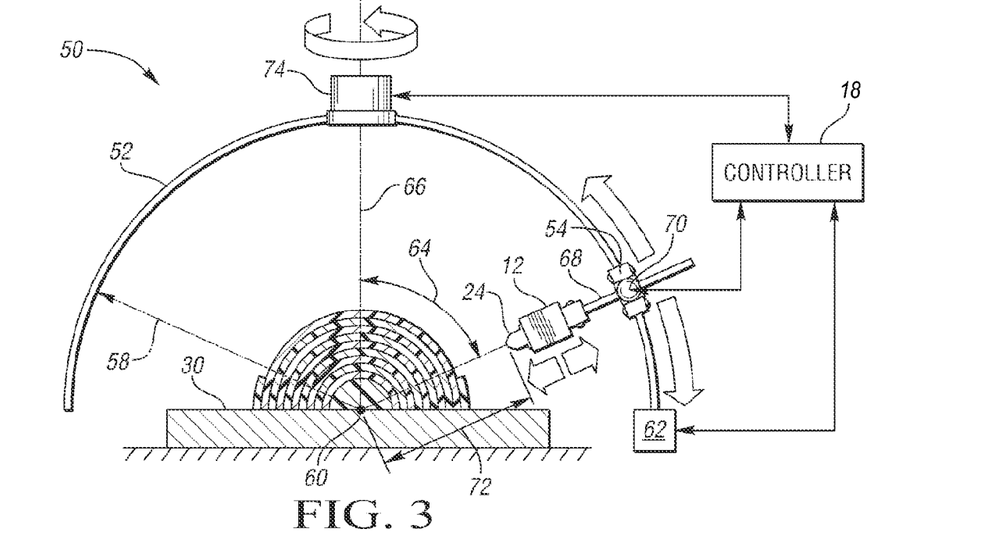
FIG. 3 is a schematic cross-sectional side view of an embodiment of a 3D printer configured to print a hemispherical object using spherical-based control.

FIG. 3 schematically illustrates a 3D printer 50 that is natively controllable in a spherical coordinate system. As shown, the 3D printer 50 can create a hemispherical object with a continuous edge profile, and that does not have as noticeable of a stair-stepped edge contour. In general, this style of printer may be particularly useful when building a spherical or hemispherical object through a plurality of radially incrementing shells, such as may be used to form the core of a golf ball.

The illustrated 3D printer 50 includes an arcuate track 52 that is configured to support a movable carriage 54. The arcuate track 52 is generally disposed within a track plane that is orthogonal to the work surface 30, and may have a constant radius of curvature 58 that extends from a point 60 disposed on the adjacent work surface 30.

The movable carriage 54 is supported on the arcuate track 52 using, for example, one or more wheel, bearing, or bushing assemblies that may allow it to smoothly translate along the track 52. A first motor 62 and drive mechanism may be associated with the carriage 54 and/or track 52 to controllably translate and/or position the carriage 54 along the track 52. In general, the carriage's position along the track may form an azimuth angle 64 relative to an axis 66 that is normal to the work surface 30. The drive mechanism may include, for example, a chain or belt extending within one or more track elements, or a rack and pinion-style gear drive.

The carriage 54 may support an extension arm 68, which may, in turn, support the print head 12. The extension arm 68 may controllably translate relative to the carriage 54 to effectuate a radial movement of the print head 12. In one configuration, the extension arm 68 may translate in a longitudinal direction using, for example, a second motor 70 that is associated with the carriage 54. The second motor 70 may be configured to drive a rack and pinion-style gear arrangement, a ball screw, or lead screw that may be associated with the extension arm. The translation of the extension arm 68 thus controls a radial position 72 of the print head 12.

The motion controller 18 may be in electrical communication with both the first motor 62 and the second motor 70 to respectively control the azimuth angle 64 and radial positioning 72 of the print head 12. The motion controller 18 may be embodied as one or multiple digital computers, data processing devices, and/or digital signal processors (DSPs), which may have one or more microcontrollers or central processing units (CPUs), read only memory (ROM), random access memory (RAM), electrically-erasable programmable read only memory (EEPROM), high-speed clock, analog-to-digital (A/D) circuitry, digital-to-analog (D/A) circuitry, input/ output (I/O) circuitry, and/or signal conditioning and buffering electronics. The motion controller 18 may further be associated with computer readable non-transitory memory having stored thereon a numerical control program that specifies the positioning of the print head 12 relative to the work surface 30 in spherical coordinates (i.e., a radial position, a polar angle, and an azimuth angle $(r, \theta, \phi)$).

Figure 4:
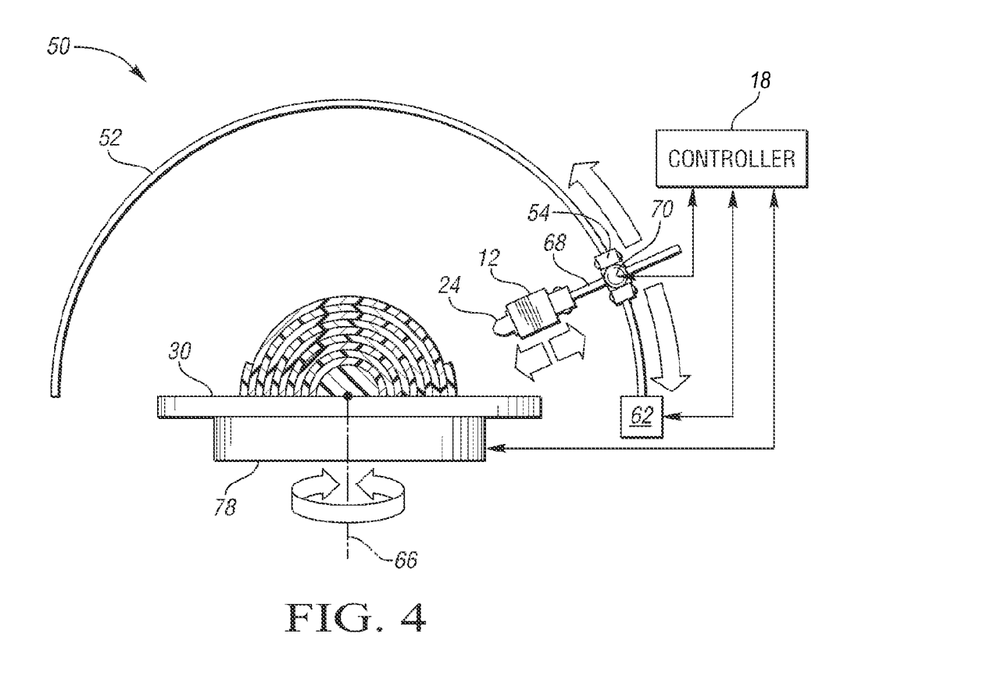
FIG. 4 is a schematic cross-sectional side view of an embodiment of a 3D printer configured to print a hemispherical object using spherical-based control.

While the azimuth angle 64 and radial positioning 72 of the print head 12 may be controlled by motors 62, 70, the polar angle may be controlled through either a rotation of the track relative to the work surface 30, such as shown in FIG. 3, or through a rotation of the work surface 30 relative to the track 52, such as shown in FIG. 4. In FIG. 3, a third motor 74 is associated with the track 52, and is configured to rotate the track 52 (and track plane) about an axis 76 that is normal to the work surface 30. Conversely, FIG. 4 illustrates an embodiment having a stationary track 54, and wherein the polar angle is controlled using a rotatable turntable 78 (where the turntable 78 defines the work surface 30).

Figure 5:
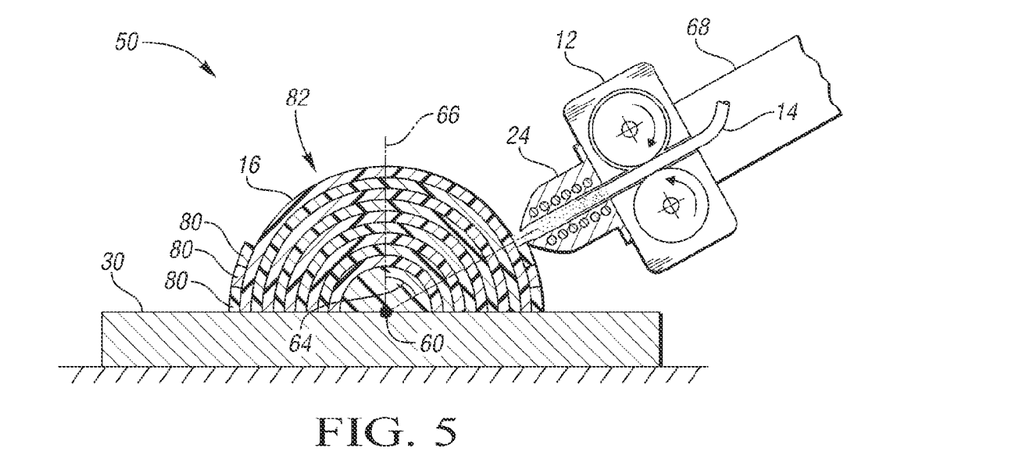
FIG. 5 is an enlarged schematic cross-sectional side view of an embodiment of a 3D printer printing a hemispherical object by forming a plurality of concentric shells.

Using the 3D printer 50 provided in either FIG. 3 or FIG. 4, the print head 12 may apply a hemispherical material layer to an underlying hemispherical substrate 16, such as schematically shown in FIG. 5. In one configuration, the hemispherical material layer may be formed, for example, by printing a plurality of rings 80 of material, each at a different azimuth angle 64 between 90 degrees and 0 degrees. By varying the azimuth angle 64, rather than a Z-axis positioning, the stair-stepped edge contour is greatly reduced. Moreover, actuation in only one degree of freedom (i.e., the polar dimension) is required to form a ring 80 of material. As such, the 3D printer 50 may print a natively continuous circle that greatly simplifies the computational requirements needed to generate the numerical control program (as compared with Cartesian-based control that must coordinate the actuation of two different actuators to generate a similar circle).

Using the native-spherical 3D printer 50, a solid hemisphere 82 may be constructed by forming a plurality of layers/shells at incrementing radial distances, where each layer is formed from a plurality of individually formed rings 80. As may be appreciated, spherical coordinate control provides certain benefits, such as: reduced computational complexity; perfectly circular rings by only controlling one motor; an elimination of a need to smooth rough edge contours; and an enhanced uniformity that comes by maintaining the nozzle perpendicular to the substrate 16 across the majority of the surface. Additionally, molding the solid hemisphere using a plurality of layers allows for the composition of the solid hemisphere to be varied as a function of the radial distance.

Figure 6:
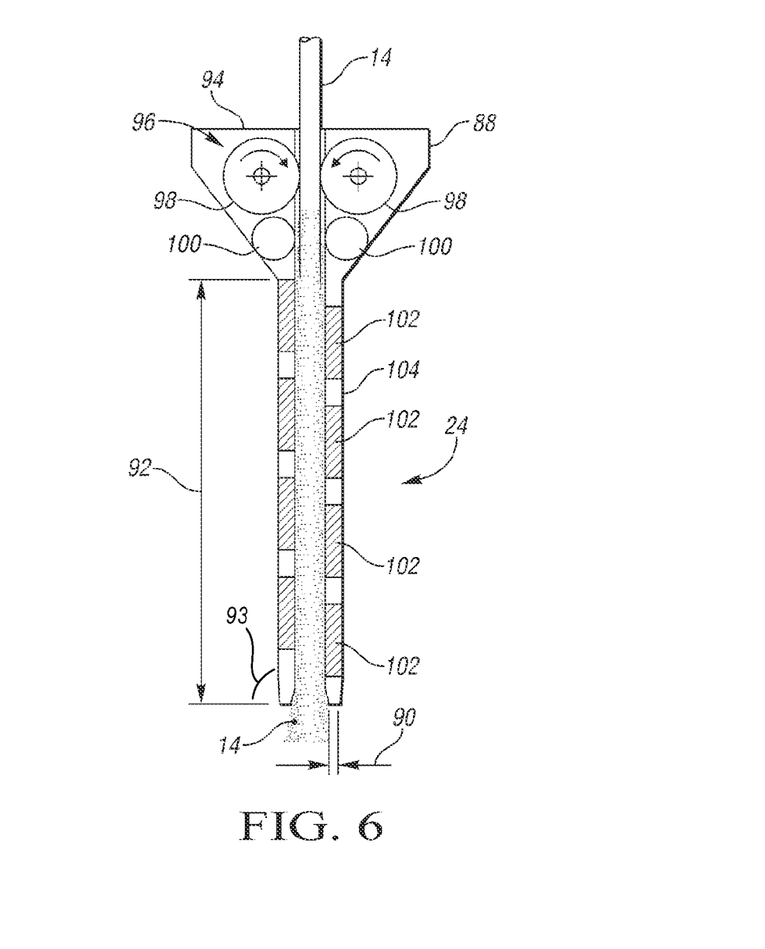
FIG. 6 is a schematic cross-sectional side view of an embodiment of a print head having an elongate thin-walled nozzle.

While 3D printing using native spherical coordinates is one manner of creating a solid hemisphere while overcoming the drawbacks demonstrated in FIGS. 1 and 2, in another configuration, modifications may be made to the print head nozzle 24 to overcome the interference issues described with respect to FIG. 2. For example, FIG. 6 illustrates an embodiment of a print head 88 where the wall thickness 90 of the nozzle 24 is minimized, the length 92 of nozzle 24 is elongated, and the draft angle 93 of the nozzle approaches 90 degrees. In this manner, when printing the base rings of a hemisphere (i.e., closest to the work surface 30) with the print head 88, it may be less likely that the nozzle 24 or the comparatively wider body portion 94 of the print head 88 may contact the substrate 16.

As shown in FIG. 6, in one configuration, the solid stock material 14 may be received in the form of a thermoplastic filament 94 that may be drawn into the print head 88 through a continuous feed mechanism 96. The continuous feed mechanism 96 may include, for example, a pair of wheels 98 disposed on opposite sides of the filament 94 that may controllably rotate in opposing directions (and at approximately equal edge velocities).

Once in the print head 88, the stock material 14 may pass by a primary heating element 100 that may melt the thermoplastic. In one configuration, the primary heating element 100 may be located within the body portion 94 of the print head. To prevent the thermoplastic from re-solidifying within the elongate nozzle 24, a secondary heating element 102 may additionally be disposed within the nozzle 24. The secondary heating element 102 may be, for example, a thin film resistor that is incorporated into the nozzle 24 (e.g., by wrapping around the inner wall, screen printing onto the inner wall, or negatively forming through etching) in order to minimize the wall thickness of the nozzle 24. In one configuration, the secondary heating element 102 may be a lower powered heating element than the primary heating element 100, though may be capable of maintaining the temperature of the nozzle 24 at or above the melting point of the thermoplastic.

In still another embodiment, the secondary heating element 102 may be the elongate thin-walled nozzle itself, such as if it is formed from a ferromagnetic metal and inductively heated using one or more externally disposed magnetic field generators.

As noted above, the nozzle 24 may also include a taper at the distal tip, also referred to as the draft angle 93. When measured relative to a plane that is orthogonal to a longitudinal axis of the nozzle, where 90 degrees is no taper (i.e., perfectly cylindrical), the draft angle 93 may be from about 45 degrees to about 90 degrees, or more preferably from about 75 degrees to about 90 degrees. This steep draft angle may be particularly suited for making a close approach to a hemispherical object, and is considerably steeper than conventional nozzles that include a draft angle from about 15 degrees to about 45 degrees. The longitudinal length 92 of the tapered portion may be from about 10 mm to about 20 mm, or even from about 10 mm to about 30 mm. As FIG. 6 generally illustrates a nozzle 24 with a 90 degree draft angle, the longitudinal length 92 of the tapered portion would be defined as the entire cylindrical length, as shown.

Figure 7:
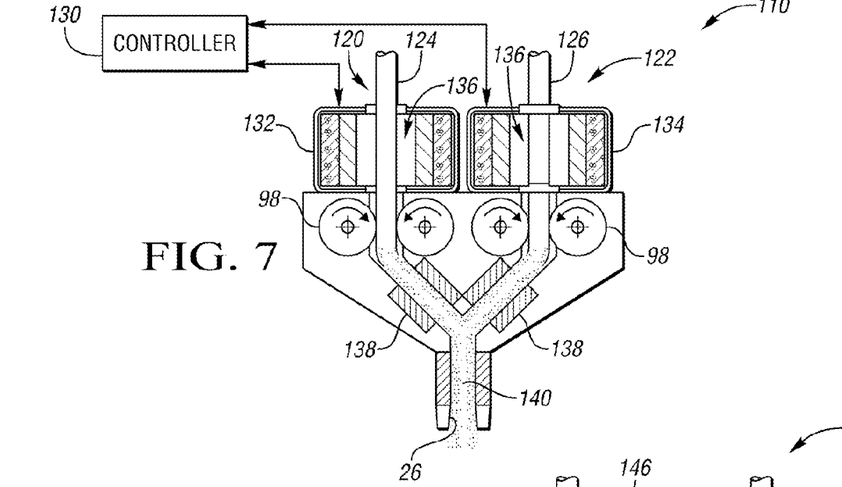
FIG. 7 is a schematic cross-sectional side view of a first embodiment of a 3D print head capable of controllably blending two materials.
Figure 8:
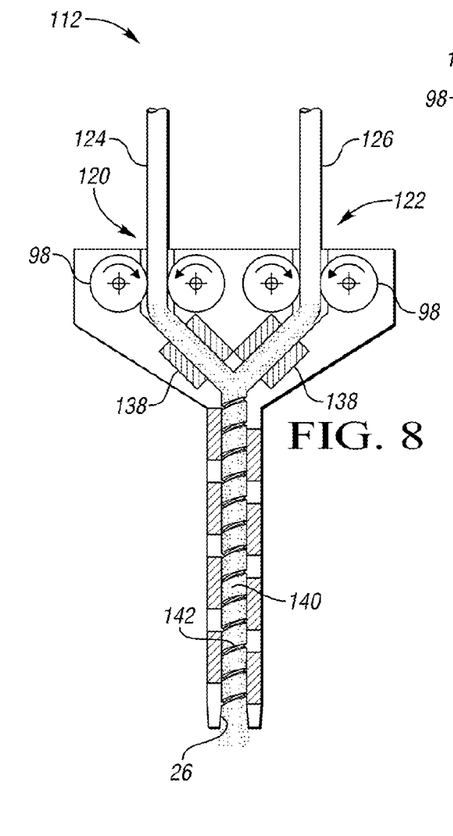
FIG. 8 is a schematic cross-sectional side view of a second embodiment of a 3D print head capable of controllably blending two materials, including an elongate nozzle.
Figure 9:
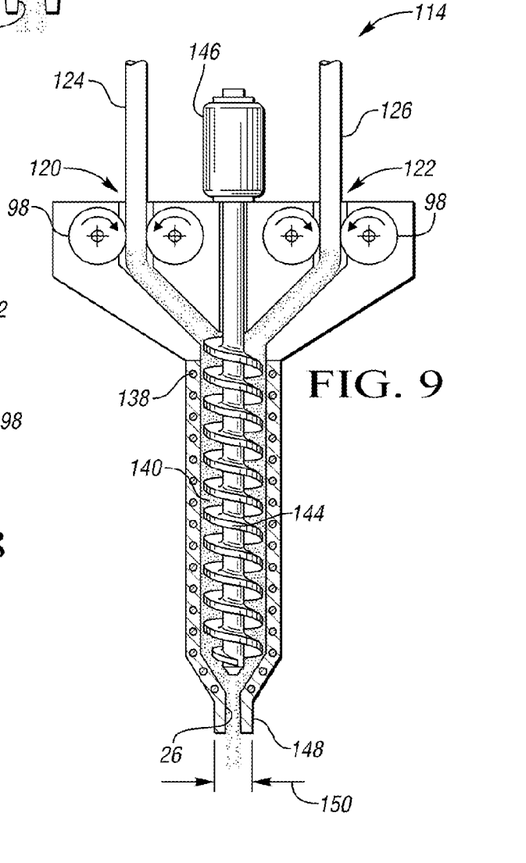
FIG. 9 is a schematic cross-sectional side view of a third embodiment of a 3D print head capable of controllably blending two materials, including an elongate nozzle and a active mixing element.

In a configuration using a thin-film heating element, an outer surface 104 of the nozzle may be radially outward of the secondary heating element 102. In one configuration where the draft angle is 90 degrees, the outer surface 104 may have a diameter of from about 0.7 mm to about 5 mm, and a wall thickness 90 of from about 0.15 mm to about 1 mm. In a configuration having a draft angle of less than 90 degrees, the wall thickness at the extreme terminal end may be from about 0.15 mm to about 1 mm, and the diameter of the orifice 26 may be from about 0.4 mm to about 1.2 mm FIGS. 7-9 illustrate three different print heads 110, 112, 114 that may be used to create a solid hemispherical object that is a blend of two different polymers. As shown, each embodiment 110, 112, 114 includes a first feed mechanism 120 and a second feed mechanism 122 that are each respectively configured to continuously draw material 14 into the print head. Each feed mechanism 120, 122 is respectively configured to receive a different stock material 124, 126. The total flow of the molten material through the orifice 26 would then be the sum of the material received by the respective feed mechanisms. The feed mechanisms 110, 112 may therefore be controlled by specifying the desired composition ratio and the desired output flow rate.

The first and second feed mechanisms 120, 122 may be individually controlled, for example, via a feed controller 130, such as shown in FIG. 7. In one configuration, the feed controller 130 may be integrated with the motion controller 18 described above, where the numerical control program that specifies print head motion is further used to specify the respective feed rates. Each feed mechanism 120, 122 may include, for example, a respective motor 132, 134 that may be used to drive the feed wheels 98 in opposing directions (e.g., through one or more gears or similar force transfer elements). In one configuration, the motors 132, 134 may have an annular shape, where the filament may pass through a hollow core 136.

As each respective filament enters the body portion 94 of the print head 110, it may be melted by a respective primary heating element 138. In one configuration, each filament may have a different primary heating element that, for example, may be able to adjust its thermal output according to the feed rate and melting point of the respective filament. In another configuration, both primary heating elements 138 may be interconnected such that they both output a similar amount of thermal energy. The primary heating elements 138 may include, for example, a resistive wire, film, or strip that may be wrapped around a material passageway within the body portion 94 of the print head 110.

Once past the primary heating element 138, the molten materials may enter a mixing cavity 140 that may be partially or entirely disposed within the nozzle 24. In one configuration, such as shown in FIG. 7, the mixing cavity may be a smooth sided cylinder, where the molten materials may mix by virtue of their converging flow paths. In a slight variant on the entirely smooth-sided design, the entrance to the mixing cavity 140 (i.e., where the two flow paths converge) may define a nozzled portion that increases flow turbulence to further facilitate mixing of the two materials.

In yet another configuration, such as generally shown in FIG. 8, the mixing cavity 140 may include one or more surface features to promote increased mixing. For example, the mixing cavity 140 may include internal threads 142 along a portion or along the entire length. The internal threads 142 (or other mixing features) may serve to passively agitate and/or mix the molten materials as they pass toward the orifice 26. In this manner, the geometry of the mixing chamber may aid in providing a homogeneous mixture of the two stock materials.

In another configuration, the two molten materials may be mixed using an active means. For example, as shown in FIG. 9, a power screw 144 may be disposed within the mixing cavity 140 to actively mix the two materials together. The power screw 144 (or other mixing element) may be either driven by a separate, mixing motor 146, or by one or both of the motors 132, 134 that are responsible for feeding the stock materials into the print head. In addition to providing a mixing effect, the power screw may also aid the material mixture in flowing through the nozzle 24.

In an embodiment that employs a power screw 144, the width of the nozzle may need to be wider to accommodate the screw. In this embodiment, the nozzle 24 may neck down to a distal tip 28 (at 148), where the distal tip 28 defines the orifice 26. The distal tip 28 may have an outer diameter 150 of from about 0.7 mm to about 5 mm, and a wall thickness of from about 0.15 mm to about 1 mm. If required for proper flow (depending on the characteristics of the stock materials), a secondary heating element may be disposed around and/or integrated into the distal tip 28.

While FIGS. 7-9 only show print head embodiments that include two feeder mechanisms, these designs may easily be expanded to three or more feeder mechanisms to suit the required application. Moreover, where a dynamically changing composition is required, the feed controller 130 may account for the travel time of the material between the respective feed mechanisms and the orifice 26, by leading the motion controller 18. In this manner, the feed controller 130 may use the volumetric feed rate of each filament through its respective feed mechanism and a known volume and/or length of the feed channels within the print head to determine/model the required lead time (i.e., where the lead time approximates the travel time of the material through print head according to the total volumetric flow rate and volume of channel between the feed mechanisms and the orifice 26).

The above described 3D printer and/or elongate print head may be used to print a solid thermoplastic hemisphere sphere, which may be used, for example, as the core of a golf ball. Moreover, in a configuration that employs multiple feed mechanisms capable of receiving different stock materials, the present system may create a hemisphere or sphere that has a varying composition as a function of the radial distance. For example, FIG. 10 generally illustrates one configuration of a hemisphere 200 of a golf ball core 202. This hemisphere may be formed via a plurality of shells 204 that are, in turn, each formed from a plurality of rings 206.

Figure 10:
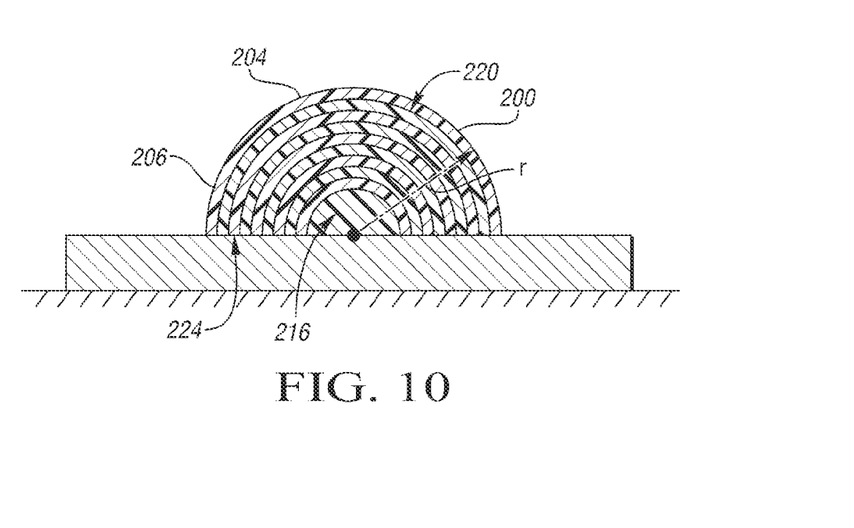
FIG. 10 is a schematic cross-sectional side view of a hemispherical portion of a golf ball core having a varying radial composition.
Figure 11:
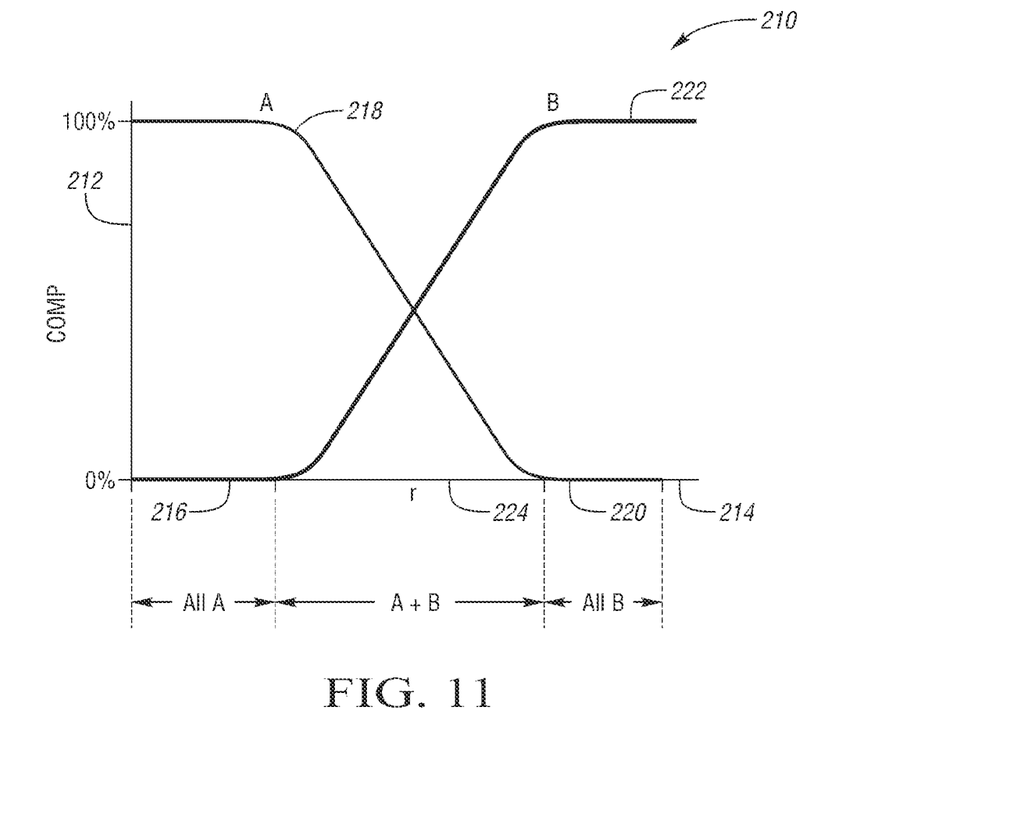
FIG. 11 is a schematic graph of the material composition of an embodiment of a 3D printed core for a golf ball as a function of a radial distance from the center of the hemisphere.

FIG. 11 generally illustrates a graph 210 of the material composition 212 of the hemisphere 200 as a function of the radial distance 214 (where material composition 212 is measured on a percentage basis between 0% and 100%). As shown, the 3D printer may vary the composition with each successive shell such that the innermost portion 216 of the hemisphere 200 is entirely made from a first material 218, the outermost portion 220 of the hemisphere 200 is entirely made from a second material 222, and an intermediate portion 224 (between the innermost and outermost portions 216, 220) is formed from a varying blend of the first material 218 and the second material 222. In one configuration, these graphs may initially have a slightly stair-stepped appearance that is attributable to the discrete thicknesses of the varying layers. This varying composition may be subsequently smoothed using one or more post-processing procedures such as heat-treating within a spherical mold, which may promote localized diffusion between the various layers. Additional description of 3D printing techniques to form a golf ball core may be found in co-filed U.S. Patent Application Publication No. 2015/0182811 entitled "3D PRINTED GOLF BALL CORE," which is hereby incorporated by reference in its entirety. In one golf ball core configuration, the printed layer thickness may be from about 0.1 mm to about 2 mm, or from about 0.4 mm to about 1.2 mm and the total number of shells/layers may be from about 9 to about 55 or more.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A three dimensional printer comprising:
a work surface;
an arcuate track disposed within a track plane that is orthogonal to the work surface, the track having a constant radius of curvature extending from a point on the work surface;
a motor coupled with the arcuate track and configured to controllably rotate the track plane about an axis extending normal to the work surface;
a carriage slidably disposed on the track and translatable relative thereto;
a print head supported by the carriage and translatable in a radial direction relative to the track; and
wherein the print head is configured to receive a solid thermoplastic material, melt the thermoplastic material, and deposit the molten thermoplastic material on a substrate.

2. The printer of claim 1, wherein the print head includes:
a nozzle defining a print orifice;
a mixing cavity disposed within the nozzle and in fluid communication with the orifice;
a first filament feeder configured to controllably advance a first thermoplastic filament into the mixing cavity at a first feed rate;
a second filament feeder configured to controllably advance a second filament into the mixing cavity at a second feed rate; and
a heating element in thermal communication with the mixing cavity and configured to melt each of the first filament and the second filament.

3. The printer of claim 2, further comprising a controller configured to control the motion of the print head relative to the work surface in three dimensions, and to control the respective feed rate of each of the first and second filament feeders.

4. The printer of claim 3, wherein the controller is configured to control the motion of the print head relative to the work surface by:
- specifying a radial distance, a polar angle, and an azimuth angle for the print head relative to the work surface;
- controlling the motion of the carriage along the track to achieve the azimuth angle;
- controlling the motion of the print head relative to the carriage to achieve the radial distance; and
- controlling the relative rotation between the arcuate track and the work surface to achieve the polar angle.

5. The printer of claim 2, wherein each of the first and second filament feeders includes a respective pair of feeder wheels configured to rotate in opposing directions to advance the respective filament.

6. The printer of claim 2, wherein the nozzle is configured to expel a molten material through the orifice, and wherein the molten material is a mixture of the first filament and the second filament.

7. The printer of claim 1, further comprising a turntable defining the work surface; and
wherein the turntable is configured to controllably rotate about an axis normal to the work surface.

8. A three dimensional printer comprising:
- a work surface;
- an arcuate track disposed within a track plane that is orthogonal to the work surface, the track having a constant radius of curvature extending from a point on the work surface;
- a motor coupled with the arcuate track and configured to controllably rotate the track plane about an axis extending normal to the work surface;
- a carriage slidably disposed on the track and translatable relative thereto;
- a print head supported by the carriage and translatable in a radial direction relative to the track, the print head including:
  - a nozzle defining a print orifice;
  - a mixing cavity disposed within the nozzle and in fluid communication with the orifice;
  - a first filament feeder configured to controllably advance a first filament into the mixing cavity at a first feed rate;
  - a second filament feeder configured to controllably advance a second filament into the mixing cavity at a second feed rate; and
  - a heating element in thermal communication with the mixing cavity and configured to melt each of the first filament and the second filament.

9. The printer of claim 8, further comprising a turntable defining the work surface; and
wherein the turntable is configured to controllably rotate about an axis normal to the work surface.

10. The printer of claim 8, further comprising a controller configured to control the motion of the print head relative to the work surface in three dimensions, and to control the respective feed rate of each of the first and second filament feeders.

11. The printer of claim 10, wherein the controller is configured to control the motion of the print head relative to the work surface by:
- specifying a radial distance, a polar angle, and an azimuth angle for the print head relative to the work surface;
- controlling the motion of the carriage along the track to achieve the azimuth angle;
- controlling the motion of the print head relative to the carriage to achieve the radial distance; and
- controlling the relative rotation between the arcuate track and the work surface to achieve the polar angle.

12. The printer of claim 8, wherein each of the first and second filament feeders includes a respective pair of feeder wheels configured to rotate in opposing directions to advance the respective filament.

13. The printer of claim 8, wherein the nozzle is configured to expel a molten material through the orifice, and wherein the molten material is a mixture of the first filament and the second filament.

14. The printer of claim 8, wherein the heating element is a wire coiled about the mixing cavity.

* * * * *